United States Patent [19]
Andronica

[11] Patent Number: 5,957,017
[45] Date of Patent: Sep. 28, 1999

[54] DEAD CENTER FOR MACHINE TOOLS

[76] Inventor: Randall Andronica, 1815 Coleman St., Brooklyn, N.Y. 11234

[21] Appl. No.: 08/902,200

[22] Filed: Jul. 29, 1997

Related U.S. Application Data

[63] Continuation-in-part of application No. 08/434,938, May 4, 1995., abandoned

[51] Int. Cl.$^6$ .................................................. B23B 23/02
[52] U.S. Cl. ............................................... 82/150; 82/170
[58] Field of Search ............................. 82/150, 170, 148, 82/164; 408/56, 57

[56] References Cited

U.S. PATENT DOCUMENTS

| | | | |
|---|---|---|---|
| 322,322 | 7/1885 | Rich | 82/150 |
| 412,926 | 10/1889 | Knight | 82/150 |
| 1,539,337 | 5/1925 | Vervoort | 82/150 |
| 1,681,087 | 8/1928 | Becker | 82/150 |
| 1,889,502 | 11/1932 | Smith | 82/150 |
| 1,891,102 | 12/1932 | Marquis | 82/150 |
| 2,397,371 | 3/1946 | Reynolds | 82/150 |
| 3,756,102 | 9/1973 | Casey | 82/150 X |
| 4,111,082 | 9/1978 | Kohori | 82/150 |

FOREIGN PATENT DOCUMENTS

| | | | |
|---|---|---|---|
| 1037805 | 8/1958 | Germany | 82/150 |

*Primary Examiner*—Andrea L. Pitts
*Assistant Examiner*—Henry W. H. Tsai
*Attorney, Agent, or Firm*—Galgano & Burke

[57] ABSTRACT

A dead center work support for a machine tool comprises a plurality, preferably at least three concentrically rounded raised radial projections defining the bearing surface of the dead center. The radial projections may be disposed either on the external or internal surfaces, which can be cylindrical, conical, or spherical. Between bearing surfaces a cut out section can be provided so that a cutting tool can run into the void to perform facing and turning of a center supported workpiece. Preferred embodiments comprise provisions for supplying lubricating oil through the tool to achieve continuous lubrication of the interface between the work and the center. The bearing surfaces may comprise hard, high-temperature resistant material, such as tungsten carbide, or ceramic.

18 Claims, 4 Drawing Sheets

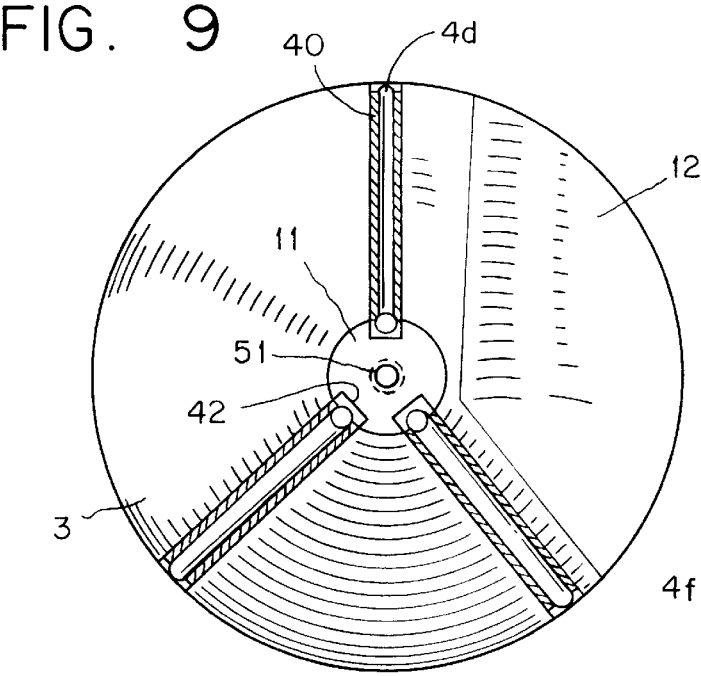
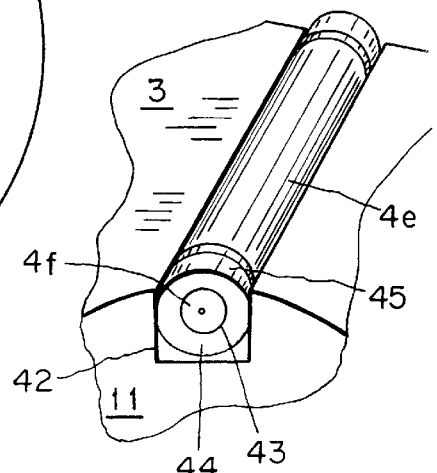
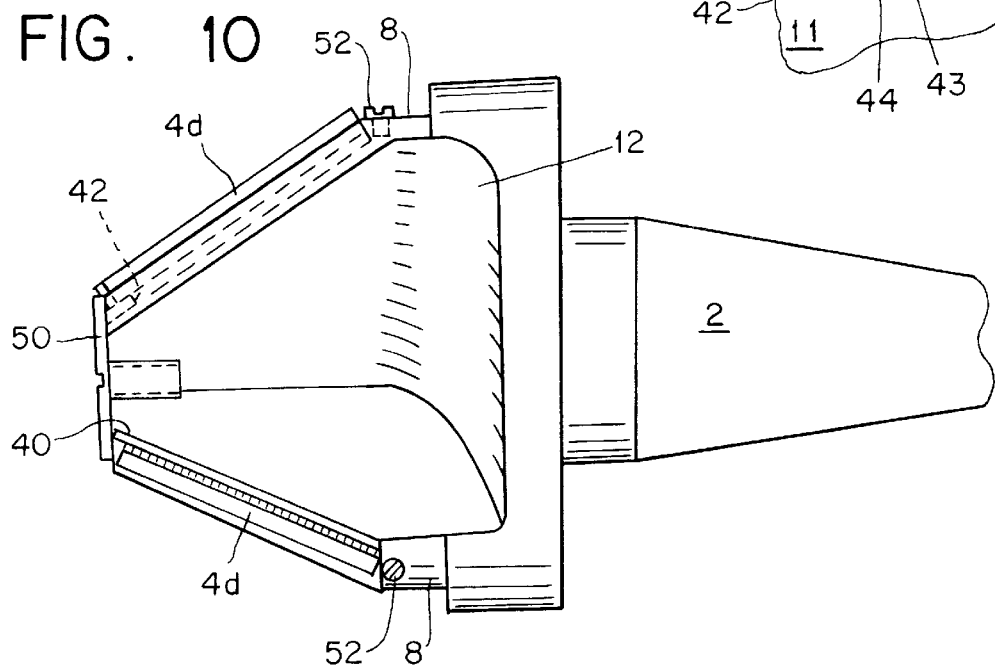
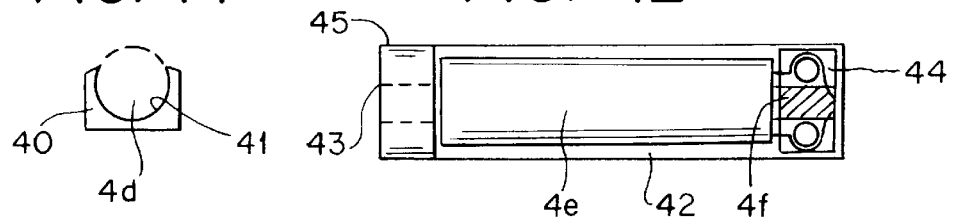

DEAD CENTER FOR MACHINE TOOLS

RELATED APPLICATION INFORMATION

This Application is a continuation-in-part of U.S. patent application Ser. No. 08/434,938, filed on May 4, 1995, which is now abandoned.

BACKGROUND OF INVENTION

The invention relates to machining and more particularly to improvements in dead centers. Centers are used to support the ends of long workpieces for machining. The work rotates relative to the dead center, creating friction between the parts that can burn both members.

Conventional practice dictates that the operator apply a film of grease or lubricant prior to engaging the center with the work, as lubricant applied with the center engaged is ineffective. The operator must then be vigilant to insure the work and/or center does not overheat from lack of lubrication—stopping the machine periodically to check for binding or burning and, when necessary, backing out and relubricating the center. Such practice wastes time and cannot be regarded as reliable. The problem is at least two centuries old, and is the subject of some early patents.

Industry has successfully circumvented the problem by developing live centers that rotate with the work. Dead centers have, however, a number of advantages over live centers, including higher precision, lower cost and less tool interference, making for easier setups. In addition, they are essentially unaffected by fine grit or swarf, and have the ability to support greater loads.

The current invention offers the inherent advantages over live centers while overcoming the fundamental problem associated with dead centers, and offers additional advantages as well.

OBJECTIVES OF THE INVENTION

It is, therefore, a primary objective to provide a center that will prevent galling, binding, scoring, burning, and the inaccuracies that result from the rotational friction that is generated by the metal to metal contact between work and center.

Another objective is to provide a center that can be "resharpened" several times before requiring replacement, if the bearing surfaces become damaged or worn.

Still another objective is to provide a center with cutout sections between bearing surfaces so that a cutting tool may run into the void to perform facing, and turning down a diameter to the center support of a workpiece.

Other objectives and advantages will be seen from the text and drawings that follow.

PRIOR ART

As stated the prior art is old. As early as 1860, Lefever and Barnes, U.S. Pat. No. 26,998, show a center having through the tool lubrication. Several other patents, featuring through the tool lubrication followed: Porter, No. 104,995 and Roe, No. 474,265. Roe teaches through the tool lubrication in combination with a discontinuity or interruption of the surface. This is the basis of virtually all later patents with through the tool lubrication. The interruption of the center's surface allows the escape of oil which would otherwise not lubricate the surfaces. The center effectively acts as a plug, sealing the surface, and prevents effective lubrication from the inside or outside with the center engaged. The patent to Smith, No. 1,889,502 shows a center having internal lubrication in combination with a hard wearing insert and an oil groove or discontinuity.

Despite these improvements, no dead center has heretofore been able to perform for any length of time without showing damage to either the center or the work. Even with internal lubrication, the conditions are extreme and lubrication alone is insufficient under heavy loads or higher rpm's. The rubbing action of rotating one member against another is the basis of friction induced welding.

The use of a hard wearing member only delays the inevitable. Furthermore, an oil groove or discontinuity acts as a cutting edge against the softer rotating work, damaging the center hole.

The patent to Rich, No. 322,322 shows a center having a portion of the cone cut away to provide tool clearance for machining a center supported part. Again, the interruption of the surface makes the work subject to discontinuity damage.

The patent to Lingo, No. 1,252,274, discloses a workholding device for lathes which, while bearing a superficial resemblance to the current invention, has a purpose and function which are entirely different. Also, the components rotate and the raised surfaces have a cutting edge which digs into and drives the work.

SUMMARY OF THE INVENTION

The current invention has provisions for supplying lubricating oil through the tool to achieve continuous lubrication of the interface between the work and the center. The bearing surfaces of the center consist of hard, high-temperature resistant material, such as tungsten carbide, or ceramic. These surfaces may be further enhanced by the use of various hard coatings such as Ovshinsky, titanium nitride, or diamond, and may also be dicronite coated to provide further lubrication.

The bearing surfaces of the tool comprises a plurality, preferably at least three, raised radial projections. The radial projections may be applied either to the external or internal surfaces, which can be cylindrical, conical, or spherical. Between bearing surfaces a cut out section can be provided so that a cutting tool can run into the void to perform facing and turning of a center supported workpiece.

DESCRIPTION OF THE DRAWINGS

FIG. 9 is a head on view of another embodiment of the invention employing rolling ribs.

FIG. 10 is a side view of the embodiment shown in FIG. 9.

FIG. 11 is a segmented head on view showing the bearing housing the rolling rib of FIG. 9.

FIG. 12 is a segmented perspective view showing another bearing type to be used with the embodiment shown in FIG. 9.

FIG. 13 is a segmented plan elevation view partially in section showing the bearing assembly in FIG. 12.

DESCRIPTION OF THE PREFERRED EMBODIMENT

Figure 1:
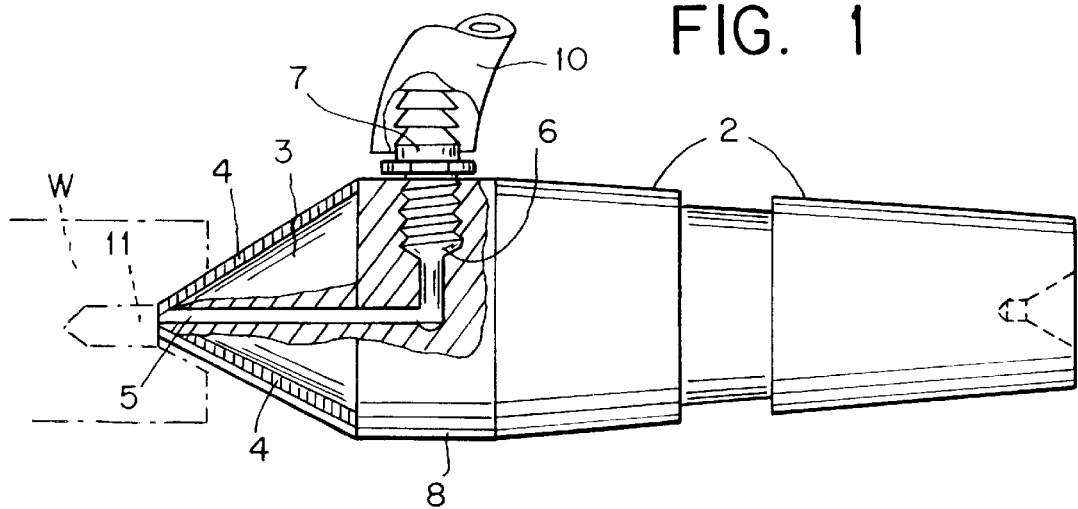
FIG. 1 is a side view of the invention partially in section taken along line 1—1 of FIG. 2.
Figure 2:
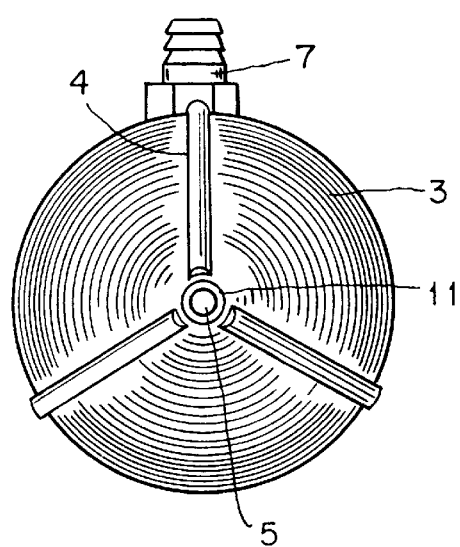
FIG. 2 is an enlarged head on view of FIG. 1.

Referring now to FIG. 1, there is shown a dead center for a machine tool having a body portion 2, and a concentric head portion 3. The body portion 2 is shown as a shallow tapered cylinder but may be another shape, and is made to seat in the tailstock or other toolholder of a machine tool. The head portion 3, is the "working-end" of the center. It comprises a relatively steep taper which is designed to engage a mating female taper in the work (shown in phantom lines). Convention dictates this angle to be 60° for both the dead center and the rotating workpiece. Mounted on the head portion 3 are a plurality of elongated, transversely contoured bearing members 4. Between the two tapered portions 2 and 3, a land 8 can be provided in cylindrical form to facilitate cross drilling a bore 6 to communicate with axial bore 5. The cone is faced off to provide a flat 11 at the tip facilitating drilling and providing a transverse wall bounding the bore 5 thus avoiding a feather edge. A barbed fitting 7 is threaded into the cross bore 6. Alternatively, the fitting 7 may be pressed or brazed into the bore 6. A hose 10 is connected between barbed fitting 7 and a reservoir (not shown in FIG. 1) to provide lubrication.

In a preferred embodiment, the source of lubrication is under high pressure and capable of forcing oil through the fine orifice of the axial bore. In this way, the work and the tool are assured continuous lubrication. Also, the flow rate can be increased under heavier machining loads or higher rpm's. The used oil can be filtered and recirculated. Elongated bearing members or ribs 4 on the conical portion 3 represent a salient feature of this invention. The bearing members 4, are preferably circumferentially arrayed equidistant about the axis of the center and can be formed of a hard wearing material such as tungsten carbide, ceramic, or even hardened steel. These surfaces can be coated to improve performance and extend tool life by various coatings such as Ovshinsky, titanium nitride, diamond, and/or dicronite, thereby providing a harder, longer wearing surface, and/or an increase in lubricity thereby lowering friction.

The bearing members 4 project above the surface of the conical portion 3. The profile of this illustrated projection is cylindrical or rounded with the outer surfaces being ground concentric with the common axis of the center. This achieves a number of important objectives. First it reduces the amount of friction that will be generated against the revolving workpiece. The amount of friction produced is determined by the rpm of the work; by the load placed upon the dead center, both axial and radial; by the coefficient of friction of the materials; by the thermal conductivity between the two materials; and by the area in contact with the work. The use of the bearing ribs reduces the area in contact with the work to little more than three tangent lines, significantly lowering friction. Bearing members 4 should, however, be rounded concentrically to match precisely the conical surface of the workpiece for a finite circumferential distance to provide a bearing pad. The members 4 can be further rounded beyond the bearing pad on a shorter radius to form a lubricant wedge. The use of through the tool lubrication lowers the coefficient of friction between the engaged surfaces. A continuous flow of oil also helps carry heat away. Chilled synthetic oil can be used to further cool the parts.

The use of a projecting bearing surface also creates paths for oil to flow out the center hole, eliminating the "plug effect" of a conventional center so that oil may bathe, and efficiently lubricate the entire interface area in contact with the center. Furthermore, the raised bearings eliminate discontinuity damage or cutting edge effect from oil grooves present in the prior art. The rounded profiles present optimal surfaces to a revolving workpiece. To the workpiece it is effectively a continuous surface without edges. As a result the dead center formed in accordance with this invention will not damage the center hole of the work. It will actually improve the geometry of the work's center hole. A burnishing action is created by the center and the peaks in the microfinish of the center hole are reduced in height with some metal flow taking place, creating a finer finish and a more accurate geometry. The center hole, in effect, becomes a mated fit to the center's geometry. The workpiece can be run for hours without damage to either the work or the center.

Figure 5:
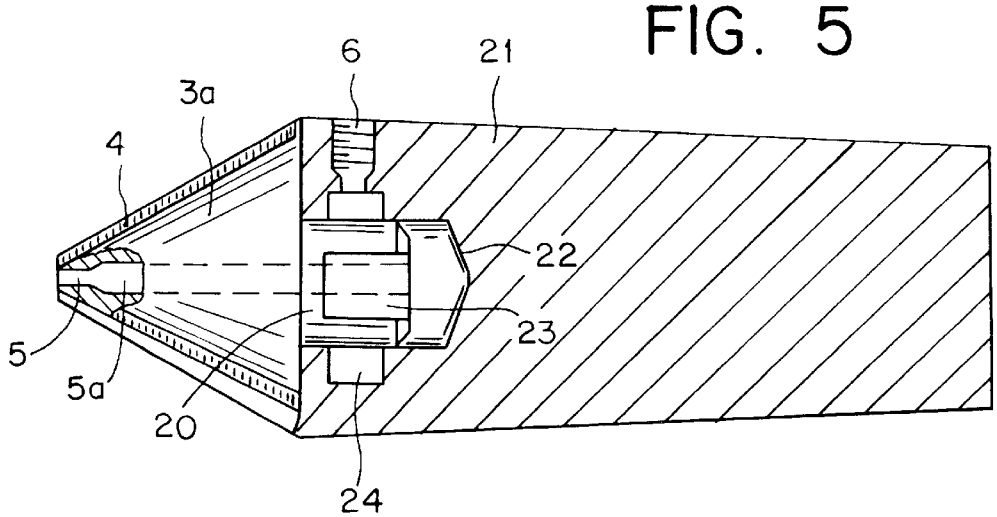
FIG. 5 is a side view of the invention partially in section showing details for construction by powder metallurgy.

The projecting members 4 can be in the form of inserts brazed into slots in the conical steel core. The slots can be rectangular in cross section, or semi-circular or V shaped, and the radially projecting rib can be circular or semi-circular in cross section although it will be understood that other rounded geometrical configurations can be used. Alternatively, the entire head 3a, as shown in FIG. 5, can be molded with integral bearing projections 4, using either ceramic or carbide. The head 3a may then be secured into a steel body 1 by press fit or by brazing. The head portion 3a has a stepped diameter 20 which is secured in an axial bore 21 in the body 1. The stepped diameter 20 can be formed with opposing flats 23. The threaded cross bore 6 terminates in an annular groove 24. In this way oil enters through threaded bore 6, flows around angular groove 24 along flat 23 into a cone 22 of the axial bore 21, and out the axial bore 5 of head 3a. The axial bore 5 can be a stepped bore with an enlarged diameter at 5a, facilitating the flow of oil. This arrangement eliminates the need for a cross bore in head 3a which is not suitable to powder metallurgy forming processes.

Figure 3:
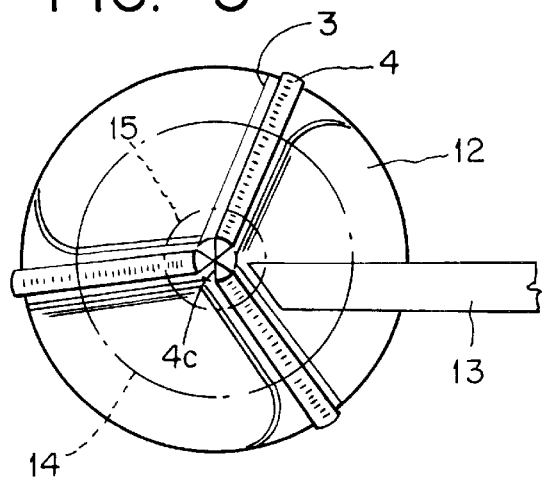
FIG. 3 is a head on view of another embodiment of the invention.
Figure 4:
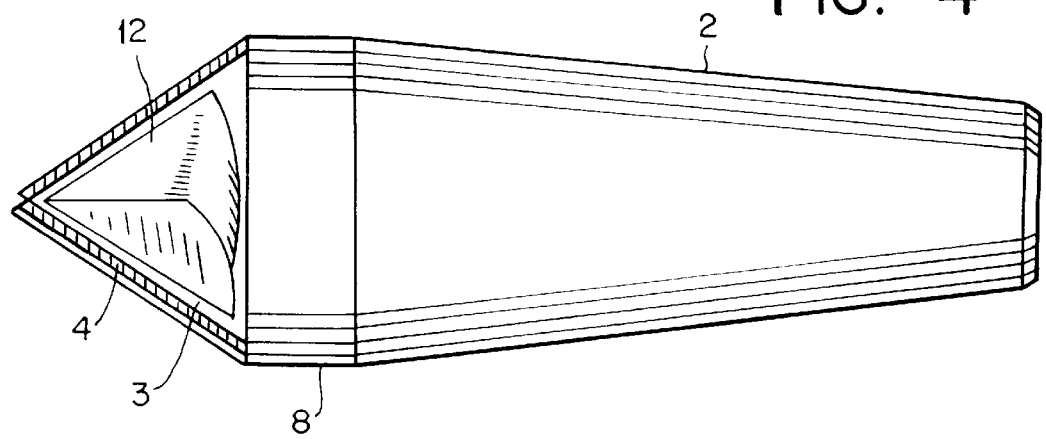
FIG. 4 is a side view in reduced scale of the embodiment shown in FIG. 3.

In the embodiment of the invention in FIGS. 3 and 4, there is an undercut area or void 12 between projecting bearing members 4. This allows a cutting tool 13 to run off the work into the void, permitting facing or turning of a center-supported workpiece 14 right down to the center support hold 15 in the workpiece. This facilitates setups and permits corrections if a center hole is too deep or a shoulder too long.

As the pocketed or undercut embodiment of FIGS. 3 and 4 has a large void 12 between the ribs, the through-the-tool lubrication feature may be omitted. Lubrication can be directed externally to the center/workpiece and be effective. The omission of the center hole allows the rib members 4 to come to center, the end of the ribs 4c being pointed or relieved on their periphery so they may converge to the center. The advantage of this is that it allows the center to get into smaller holes.

Figures 6A, 6B:
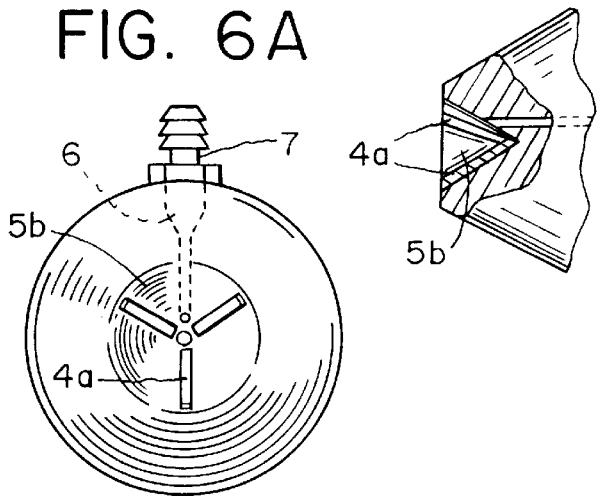
FIG. 6A is an end view of another embodiment of the invention employing a female center.
FIG. 6B is a side view of the embodiment shown in FIG. 6A, partially in section.

The use of the multiple projecting bearing ribs can be extended to other center applications. A female center embodiment, with an internal conical surface 5*b* and projecting hard wearing bearing members 4*a*, is shown in FIG. 6 and can be utilized for workpieces too small to support a center hole.

Figure 7:
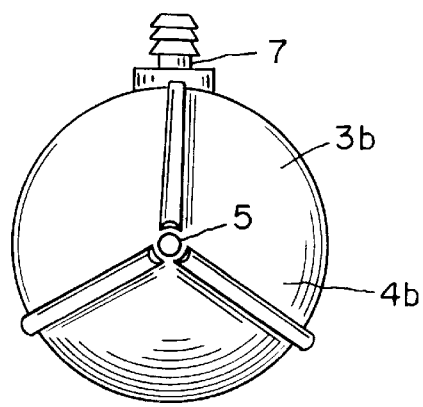
FIG. 7 is an end view of another embodiment of the invention employed on a hemispherical head center.
Figure 8:
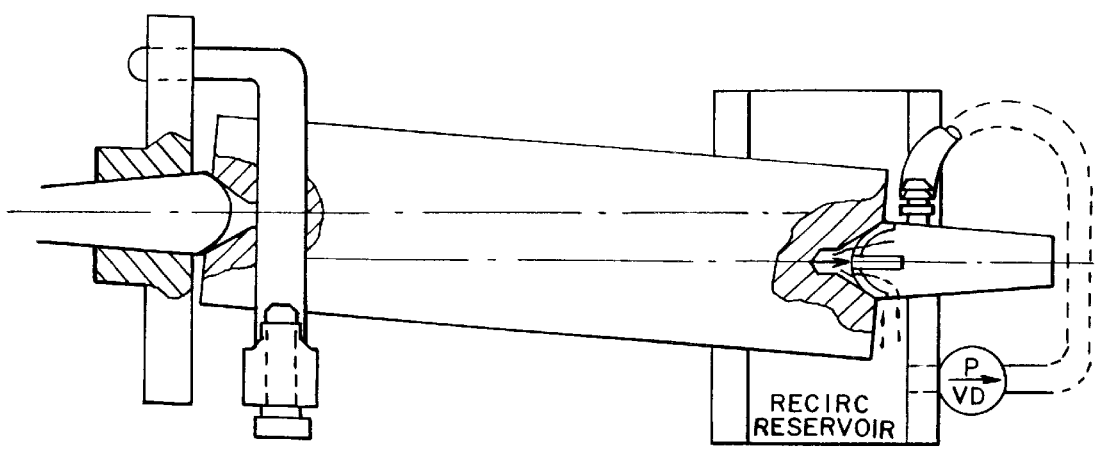
FIG. 8 is a top elevation view partially in section showing the application of the hemispherical head center of FIG. 7 for producing tapered parts with the tailstock offset method and showing recirculation of the lubricating oil.

In the embodiment shown in FIG. 7, raised bearing members may also be placed or formed on a center with a hemispherical head 3*b* (as opposed to a conical head). This center is suited to taper turning of parts with the tailstock offset, a method which tilts the work out of alignment with the axis of the lathe as shown in FIG. 8. The hemispherical head center acts as a ball joint accommodating the tilt of the work. It will be understood that the use of a hemispherical dead center head and corresponding curved bearing ribs will result in tangent point contact with the conical recess in the workpiece resulting in higher unit pressure contact.

In FIGS. 9 and 10 is shown a larger bull nose embodiment of the pocketed or undercut version shown in FIGS. 3 and 4. In this case the raised ribs 4 are replaced with cylindrical rolling ribs 4*d*. For smaller bull nose centers, a simple oilite bearing 40 may house the rolling ribs 4*d*, which may be made from hardened steel or other suitable material. The oilite bearing has a precision hole 41 (FIG. 11) lapped or honed to receive the rolling rib 4*d*. The rectangular bearing housing 40 is a precise fit for a groove 42 machined along the length of the centers cone. The oilite bearing is either a mild press fit or is adhesive-bonded in place. Approximately ⅓ to slightly less than ½ the diameter of the rolling rib 4*d* is exposed so that the workpiece may rotate against this surface. Three or more bearing units are employed to support the workpiece.

Shown in FIG. 10 to secure the forward ends of the rolling ribs 4*d* a center screw 50 is secured into threaded axial bore 51 (FIG. 9). The outer ends of the rolling ribs are secured by screws 52 as seen in FIG. 10 to fasten into cylindrical lands 8.

For larger bull centers, the rolling ribs 4*e* (FIGS. 12 and 13) may consist of a hardened shaft with concentric turned-down diameters on either end 4*f*. The smaller diameters 4*f* of rolling ribs 4*e* are sized to fit in the I.D. 43 of a ball or roller bearing 44. The O.D. 45 of the ball bearing is a mild press fit or otherwise secured in groove 42 machined along the conical surface of the center. The groove 42 is machined slightly deeper than the radius of bearing member 44. The diameters of the rolling ribs 4*e* is sized slightly smaller than the O.D. of the bearings 45 insuring that the rolling rib will turn freely. The range of workpieces the center will accommodate must fall on the portion of the center occupied by the rolling ribs.

Since it is the ribs that rotate and not the head of the center this embodiment may have a void or pocket 12 to accommodate cutting tool run-off, allowing, for example, the facing of large diameter pipes or tubes.

Figure 14:
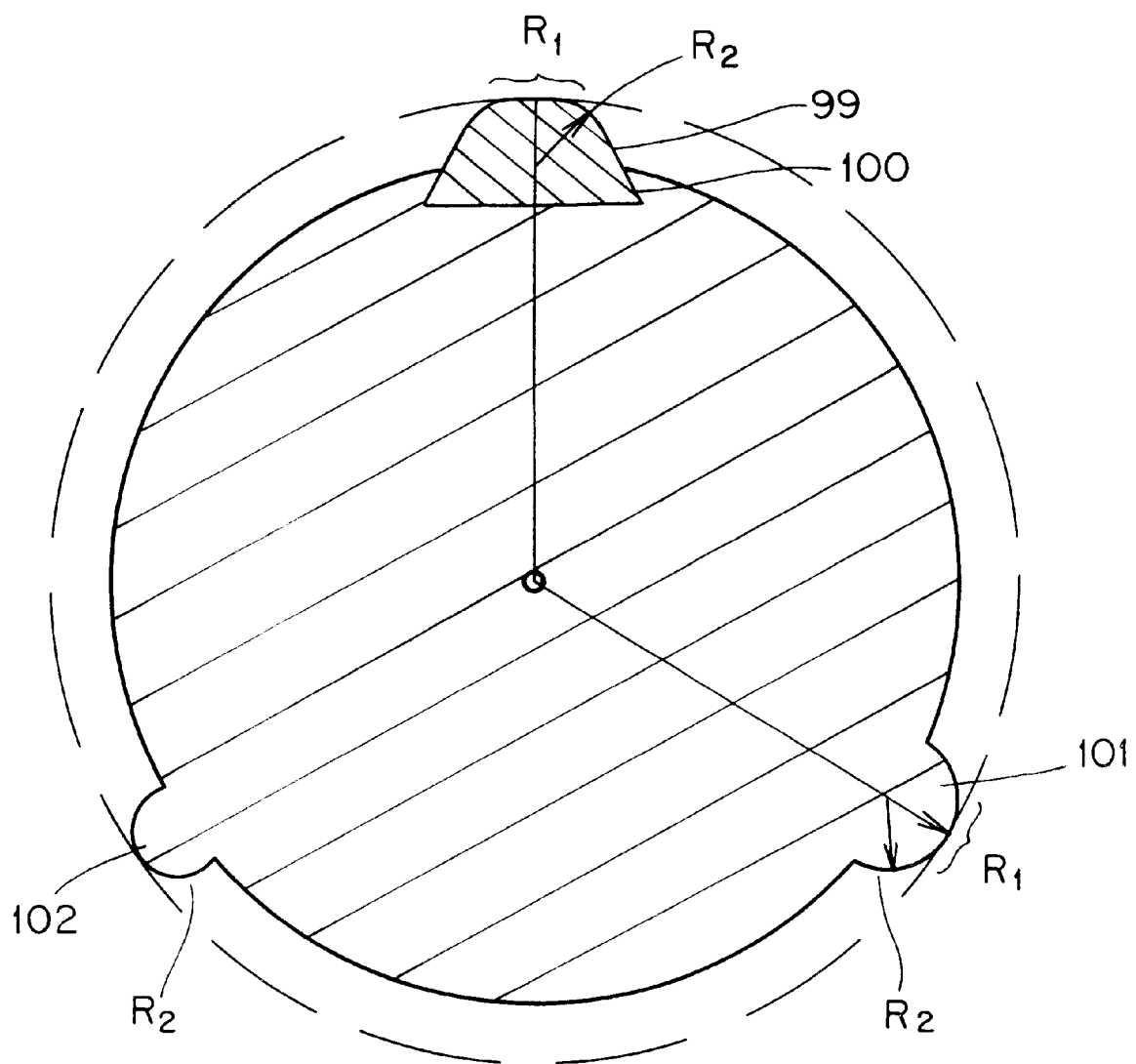
FIG. 14 is a cross-sectional view illustrating the bearing ribs of different embodiments of the present invention.

FIG. 14, which is provided for illustrative purposes, shows a dead center support wherein different types of bearing ribs are illustrated. Each of the illustrated bearing ribs have an outer radius R1 on their bearing surfaces and then a reduced radius surface R2 which is beyond the bearing surfaces. Rib 99 is in the form of an insert which has been positioned in a slot 100 while ribs 101 and 102 are integrally formed with the head of the dead center support.

While preferred embodiments of the invention have been described above, it will be understood that the invention can take other forms and embodiments. For example, the bearing ribs 4 can be seated in recesses in the head 3 of various geometries such as round, square or 90° notches, and the transverse contouring and number of ribs can be designed to increase or decrease bearing areas as required for specific load characteristics. The invention should not, therefore, be regarded as limited except as set forth in the following claims.

I claim:

1. In a machine tool, a dead center support for engaging a rotary workpiece to be machined in which the engaged dead center support and workpiece have complementary male and female circular surfaces and at least the engaged surface of the workpiece is substantially conical and concentric with the axis of rotation thereof, the invention comprising:

a plurality of at least three circumferentially spaced elongated radially converging, bearing ribs, the bearing surfaces of which are concentric with the axis of rotation and adapted to engage the complementary contoured circular surface of the workpiece, and wherein the bearing surfaces of the ribs are transversely rounded to match the curvature of the conical surface of the workpiece.

2. A dead center support according to claim 1 in which the bearing ribs are rounded on a reduced radius beyond their bearing surfaces.

3. A dead center support according to claim 1 in which the bearing ribs are carried by a head portion which comprises a truncated cone substantially matching the angle of the complementary conical surface of the workpiece but spaced therefrom to define a shallow toroidal space for accommodating a lubricant.

4. A dead center support according to claim 1 including means for circulating a lubricant through the spaces between said ribs and a supported surface of the workpiece.

5. A dead center support according to claim 4 wherein said circulating means comprises a conduit in the dead center support terminating adjacent the circular surface thereof, and which communicates with spaces between said spaced, elongated radially converging, bearing ribs.

6. A dead center support according to claim 5 including means for metering the flow of lubricant to establish lubricant back pressure in spaces between the bearing ribs.

7. A dead center support according to claim 1 including means defining at least one cavity in the support between bearing ribs for receiving a cutting tool of the machine tool.

8. A dead center support according to claim 1 in which at least a portion of said dead center support is rounded axially between its bearing ribs to afford tilting displacement of the support relative to the workpiece.

9. In a machine tool, a dead center support for engaging a rotary workpiece to be machined in which the engaged dead center support and workpiece have complementary male and female circular surfaces and at least the engaged surface of the workpiece is substantially conical and concentric with the axis of rotation thereof, the invention comprising:

a plurality of at least three circumferentially spaced elongated radially converging, bearing ribs, the bearing surfaces of which are concentric with the axis of rotation and adapted to engage the complementary contoured circular surface of the workpiece, and wherein the bearing surfaces of the ribs are transversely rounded to match the curvature of the conical surface of the workpiece, and wherein the bearing ribs are cylindrical rolling ribs rotatably journalled in the dead center.

10. In a machine tool, a dead center support for engaging a rotary workpiece to be machined in which the engaged dead center support and workpiece have complementary male and female circular surfaces and at least the engaged surface of the workpiece is substantially conical and concentric with the axis of rotation thereof, the invention comprising:

a plurality of at least three circumferentially spaced elongated radially converging, bearing ribs, the bearing surfaces of which are concentric with the axis of rotation and adapted to engage the complementary contoured circular surface of the workpiece, and wherein the bearing surfaces of the ribs movably contact the conical surface of the rotating workpiece.

11. A dead center support according to claim 10 in which the bearing ribs are rounded on a reduced radius beyond their bearing surfaces.

12. A dead center support according to claim 10 in which the bearing ribs are carried by a head portion which comprises a truncated cone substantially matching the angle of the complementary conical surface of the workpiece but spaced therefrom to define a shallow toroidal space for accommodating a lubricant.

13. A dead center support according to claim 10 including means for circulating a lubricant through the spaces between said ribs and a supported surface of the workpiece.

14. A dead center support according to claim 13 wherein said circulating means comprises a conduit in the dead center support terminating adjacent said circular surface end thereof, and which communicates with spaces between said spaced, elongated radially converging, bearing ribs.

15. A dead center support according to claim 14 including means for metering the flow of lubricant to establish lubricant back pressure in spaces between the bearing ribs.

16. A dead center support according to claim 10 further comprising at least one cavity in the support between bearing ribs for receiving a cutting tool of the machine tool.

17. A dead center support according to claim 10 in which at least a portion of said dead center support is rounded axially between its bearing ribs to afford tilting displacement of the support relative to the workpiece.

18. A dead center support as set forth in claim 10 in which the bearing ribs are cylindrical rolling ribs rotatably journaled in the dead center.

* * * * *